(12) United States Patent
Kataoka et al.

(10) Patent No.: US 6,388,041 B1
(45) Date of Patent: May 14, 2002

(54) POLYOXYETHYLENE DERIVATIVES HAVING OPTIONALLY PROTECTED AMINO GROUP AT ONE END AND PROCESS FOR PRODUCING THE SAME

(75) Inventors: Kazunori Kataoka, Tokyo; Masao Kato, Tsukuba; Yukio Nagasaki, Ibaraki-ken; Takahisa Hayashida, Ichihara; Michihiro Iijima, Oyama; Teruo Okano, Ichikawa, all of (JP)

(73) Assignee: Nano Carrier Co Ltd, Chiba (JP)

( * ) Notice: Subject to any disclaimer, the term of this patent is extended or adjusted under 35 U.S.C. 154(b) by 0 days.

(21) Appl. No.: 09/674,849
(22) PCT Filed: May 6, 1999
(86) PCT No.: PCT/JP99/02350
  § 371 Date: Nov. 7, 1999
  § 102(e) Date: Nov. 7, 1999
(87) PCT Pub. No.: WO99/57174
  PCT Pub. Date: Nov. 11, 1999

(30) Foreign Application Priority Data

May 7, 2000 (JP) ........................................ 2000-139225

(51) Int. Cl.[7] .............................................. C08G 77/08
(52) U.S. Cl. ............................. 528/14; 528/26; 528/27; 528/38; 528/407; 528/409; 528/421; 556/401; 556/412; 560/125; 560/170; 560/189; 560/190; 560/198; 560/200; 564/475

(58) Field of Search ................................. 556/401, 412; 528/27, 26, 38, 14, 407, 409, 421; 560/125, 170, 189, 198, 190, 200; 564/475

(56) References Cited

U.S. PATENT DOCUMENTS 5,483,008 A * 1/1996 Sakurai et al. ............... 525/408
5,493,038 A * 2/1996 Hall et al. .................... 556/412
6,121,474 A * 9/2000 Schwindeman et al. .... 556/410

* cited by examiner

*Primary Examiner*—Margaret G. Moore
(74) *Attorney, Agent, or Firm*—Sherman & Shalloway

(57) ABSTRACT

Disclosed are polyoxyethylene derivatives having different functional groups at both ends of the molecule represented by the following formula (I) and a process for producing the derivatives by anionic living polymerization. The present invention provides polymers which are especially suitable for use as medical materials.

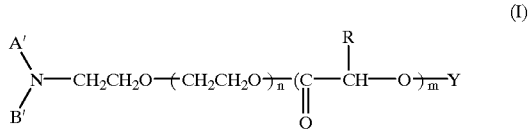

wherein A' and B' are organosilyl type amino-protecting groups, R is a hydrogen atom or a $C_{1-6}$ alkyl group, and Y is a hydrogen atom, an alkali metal or a certain functional group.

12 Claims, 3 Drawing Sheets

POLYOXYETHYLENE DERIVATIVES HAVING OPTIONALLY PROTECTED AMINO GROUP AT ONE END AND PROCESS FOR PRODUCING THE SAME

TECHNICAL FIELD

This invention relates to polyoxyethylene derivatives having an optionally protected amino group at one end and a process for producing the same. More particularly, this invention relates to polymers or oligomers containing a polyoxyethylene segment and having at one end an amino group which may optionally be protected by an organosilyl type amino-protecting group, and a process for producing the same, as well as living polymerization initiators which can be used in the process.

In this description, the derivatives of the present invention are generically referred to as polyoxyethylene derivatives by prefixing "poly" thereto. However, this concept is used in the broadest sense so as to comprehend polyoxyethylene segment-containing derivatives and oligo-oxyethylene segment-containing derivatives.

BACKGROUND ART

Polyoxyethylene itself, and compounds or block copolymers containing a polyoxyethylene segment, are being extensively used as surfactants, drug carriers and medical materials. For example, it has been proposed that copolymers of ethylene oxide and propylene oxide (e.g., Poloxamer) and the like may be used for the prevention of adhesion of biological tissues [Holtz, Fertil. Steril., 41(1984), 497–507] and as blood flow improvers or the like.

Moreover, in order to impart further functions to polyoxyethylene having such diverse actions, there have been proposed heterotelechelic polyoxyethylenes having various functional groups introduced at both ends of the polyoxyethylene molecule (see, for example, WO96/32434). Among such functional groups, amino and aldehyde groups are stable in water when each of them is present alone. On the other hand, an amino group reacts rapidly, for example, with carboxyl, epoxy and like groups, and an aldehyde group reacts rapidly, for example, with amino, hydroxyl and like groups. Accordingly, they can significantly enhance the functionality of polyoxyethylene derivatives.

However, when such a derivative has amino and aldehyde group at both ends of the molecule, it forms a Schiff base and, therefore, the characteristics of these functional groups cannot be fully utilized. Consequently, if a polyoxyethylene segment-containing derivative having amino and aldehyde groups protected separately by protecting groups which permit the amino and aldehyde groups to be selectively liberated as required could be provided, it would be possible to utilize the amino and aldehyde groups individually at any time according to the intended purpose.

DISCLOSURE OF THE INVENTION

Accordingly, an object of the present invention is to provide polyoxyethylene segment-containing derivatives which have optionally protected amino and aldehyde groups at both ends of the molecule and in which the protecting groups therefor, if present, may be eliminated under different conditions, as well as a process for producing such derivatives.

In order to accomplish the above object, the present inventors have searched for an amine compound which can provide a polymer or oligomer containing a polyoxyethylene segment of a desired chain length, which has a protecting group capable of being eliminated under conditions significantly different from those for the elimination of an acetal group commonly used as a protecting group for the aldehyde group, and in which the propagation reaction of the polyoxyethylene chain can advantageously be initiated on the aminic nitrogen atom by anionic living polymerization. As a result, it has now been found that the above object can be accomplished by using amine compounds protected with certain organosilyl type amino-protecting groups. Moreover, it has also been found that such amine compounds may be extensively used as living polymerization initiators in the form of alkali metal complexes.

Accordingly, the present invention relates to an extensively useful living polymerization process, and more particularly to a process for producing a polyoxyethylene derivative of the formula (I)

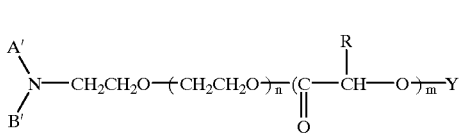

(I)

wherein:
A' and B' each independently represent an organosilyl type amino-protecting group, or represent organosilyl type amino-protecting groups capable of combining with the nitrogen atom adjacent thereto to form a four- to seven-membered disila-azacyclo heterocyclic ring, Y represents a hydrogen atom, an alkali metal, or an organic group which, when Y is an alkali metal, can be introduced by replacing the alkali metal therewith according to a suitable reaction, R represents a hydrogen atom or a $C_{1-6}$ alkyl group, n is an integer of 1 to 20,000, and m is an integer of 0 to 20,000, the process comprising the steps of polymerizing ethylene oxide in a suitable organic solvent in the presence of a living polymerization initiator of the formula (II)

(II)

wherein A' and B' have the same meanings as defined for formula (I), and M represents an alkali metal; if necessary, further polymerizing the resulting product with a cyclic diester of the formula (III)

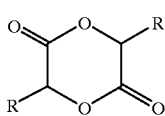

(III)

wherein each R independently represents a hydrogen atom or a $C_{1-6}$ alkyl group; and, if necessary, reacting the resulting product with a compound having an organic group which, when Y is an alkali metal, can be introduced by replacing the alkali metal therewith.

Some of the derivatives produced by the above-described process are novel and have a unique structure. Accordingly, the present invention also relates to a polyoxyethylene derivative of the following formula (I-a).

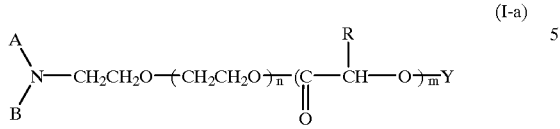
(I-a)

wherein:
A and B each independently represent a hydrogen atom or an organosilyl type amino-protecting group, or represent organosilyl type amino-protecting groups capable of combining with the nitrogen atom adjacent thereto to form a four- to seven-membered disila-azacyclo heterocyclic ring, Y represents a hydrogen atom, an alkali metal, or an organic group which, when Y is an alkali metal, can be introduced according to a suitable reaction, R represents a hydrogen atom or a $C_{1-6}$ alkyl group, n is an integer of 1 to 20,000, and m is an integer of 0 to 20,000, provided that, when both A and B are hydrogen atoms, Y is a group of the formula

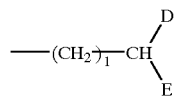

wherein D and E each independently represent an alkoxy group, or represent groups capable of combining with the carbon atom adjacent thereto to form 1,3-dioxolane that may be substituted by a lower alkyl group at the 4- or 5-position, or D and E are united together to form an oxo radical (=O), and l is an integer of 0 to 10.

Furthermore, the present invention relates to the use of a compound of the following formula (II) as a living polymerization initiator.

(II)

wherein A' and B' each independently represent an organosilyl type amino-protecting group, or represent organosilyl type amino-protecting groups capable of combining with the nitrogen atom adjacent thereto to form a four- to seven-membered disila-azacyclo heterocyclic ring, and M represents an alkali metal.

DETAILED DESCRIPTION OF THE INVENTION

Figure 1:
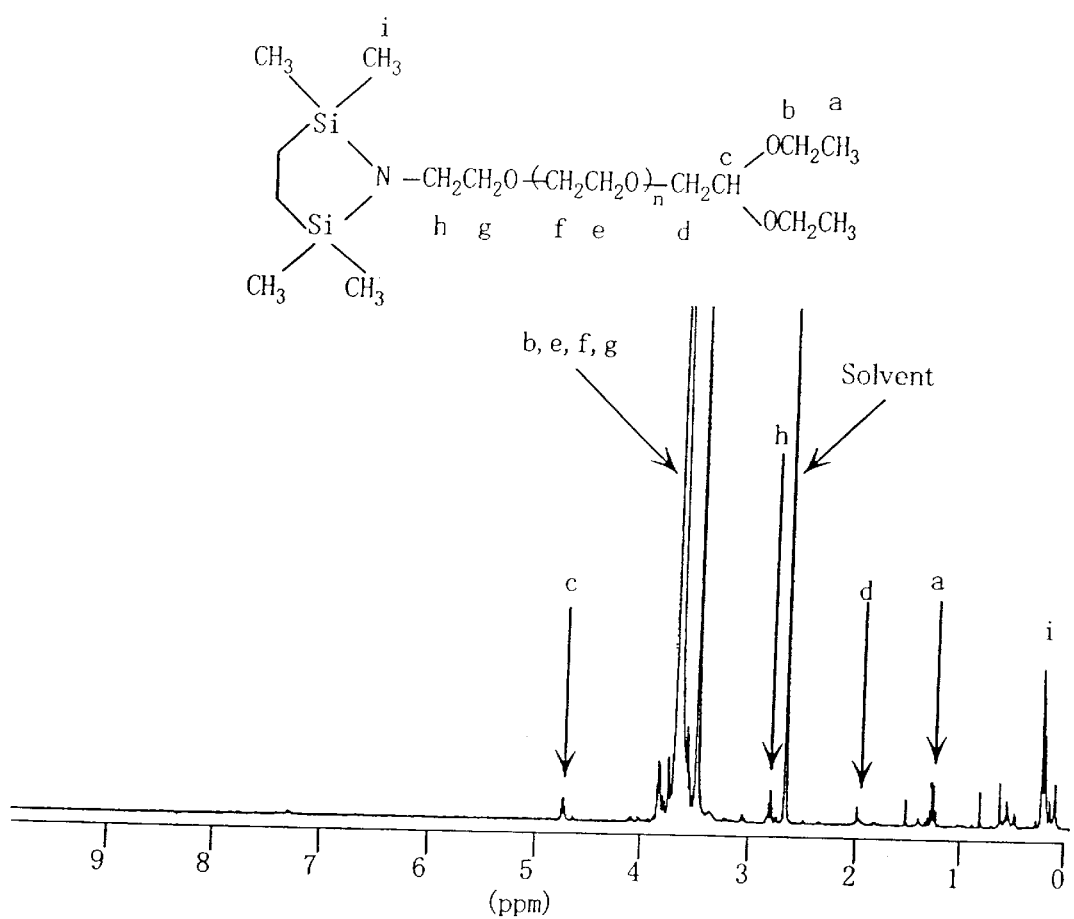
FIG. 1 shows the $^1$H-NMR spectrum of the heterotelechelic polyoxyethylene derivative obtained in Example 1 and having an organosilyl-protected amino group at the α-end and an acetal group at the ω-end.

The present invention is based on the finding that compounds of the formula (II)

(II)

wherein A' and B' each independently represent an organosilyl type amino-protecting group, or represent organosilyl type amino-protecting groups capable of combining with the nitrogen atom adjacent thereto to form a four- to seven-membered disila-azacyclo heterocyclic ring, and M represents an alkali metal, can be extensively used as living polymerization initiators for various monomers including oxiranes (e.g., ethylene oxide and propylene oxide), cyclic esters (e.g., glycollide, lactide, β-propiolactone and butyrolactone) and polar monomers (e.g., acrylic esters and methacrylic esters).

The aforesaid term "organosilyl type amino-protecting group" means a group comprising a silicon atom which has some type of organic groups attached thereto and which can be directly joined to the nitrogen atom of an amino group and thereby protect the amino group against certain reactions. Accordingly, A' and B' each represent any organic group that can protect the amino group, provided that they meet the purposes of the present invention. Specifically, the aforesaid A' and B' may be the same or different protecting groups, or may combine with each other (or may be united together) to form an amino-protecting group. These protecting groups may be silyl groups having any organic groups, provided that they can be eliminated, for example, with the aid of a tetraalkylammonium fluoride so as to meet the purposes of the present invention and that, when a compound of the above formula (II) is formed, this compound can act as a living polymerization initiator.

More specifically, A' is a silyl group represented by the formula

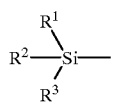

and B' is a silyl group represented by the formula

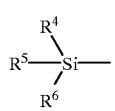

In the above formulae, $R^1$, $R^2$, $R^3$, $R^4$, $R^5$ and $R^6$ may independently represent alkyl groups and preferably $C_{1-6}$ lower alkyl groups (e.g., methyl, ethyl, n-propyl, isopropyl, n-butyl, sec-butyl, n-pentyl and n-hexyl). Where A' and B' combine with each other to form an amino-protecting group, any of $R^1$, $R^2$ and $R^3$ may combine with any of $R^4$, $R^5$ and $R^6$ to form methylene, ethylene, propylene or butylene. The amino-protecting group so formed can be represented, for example, by the formula

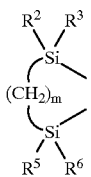

wherein m is a positive number of 1 to 4. This protecting group combines with the nitrogen atom of the amino group adjacent thereto to form a four- to seven-membered disila-azacyclo heterocyclic ring.

Among such amino-protecting groups, those which can form a four- to seven-membered disila-azacyclo heterocyclic ring and in which $R^2$, $R^3$, $R^5$ and $R^6$ independently represent lower alkyl groups are preferred. Especially preferred are those which can form 2,2,5,5-tetramethyl-2,5-disila-1-azacyclopentane.

The alkali metals which are defined by M in formula (II) include lithium, potassium, sodium, rubidium and cesium. However, preferred alkali metals are lithium, potassium and sodium.

The compounds of formula (II) may be prepared in situ during polymerization, or may be prepared separately. Specifically, they may be prepared by dissolving a corresponding silylamine of the formula

wherein A' and B' have the same meanings as defined above, in a suitable inert solvent; and adding, for example, an alkali metal (e.g., lithium, potassium or sodium) naphthalene to the resulting solution so as to react the silylamine therewith.

Examples of the aforesaid suitable organic solvent include ether solvents such as tetrahydrofuran (THF), dioxane, dimethyl ether and dimethoxyethane; aromatic hydrocarbons such as benzene, toluene and xylene; and aprotic polar solvents such as dimethyl sulfoxide, N,N-dimethylformamide and hexamethylphosphoric triamide. In particular, those solvents which do not adversely affect the function of the compounds of formula (II) as anionic polymerization initiators as will be described later are useful. Among these solvents, ether solvents are preferred and tetrahydrofuran is especially preferred.

The compounds of formula (II) may be extensively used as polymerization initiators for various monomers.

As a process in which these initiators may be used with special convenience, the present invention provides a process for producing a polyoxyethylene derivative of the following formula (I).

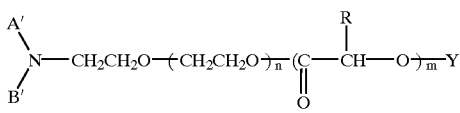

wherein A', B', R, Y, n and m have the same meanings as defined above.

Specifically, ethylene oxide is polymerized in a suitable organic solvent in the presence of a compound of formula (II). The compound of formula (II) may be prepared in situ and used directly for the polymerization reaction, or may be prepared separately and added to the solvent. As can be seen from the fact that the compound of formula (II) may be prepared in situ and used directly for the polymerization reaction, the suitable organic solvent used for the polymerization reaction of the aforesaid production process may be the same as the solvent used for the preparation of the aforesaid compound of formula (II) from the corresponding silylamine.

Ethylene oxide is added to a solution containing the compound (or initiator) of formula (II), in an amount corresponding to polyoxyethylene having a desired chain length, and reacted therewith. The compound of formula (II) is usually used in an amount of 0.0001 to 100 moles, preferably 0.0001 to 1 mole, per mole of ethylene oxide. The solvent is used in an amount of 0.1 to 1,000 parts by volume, preferably 0.5 to 100 parts by volume, per part by volume of ethylene oxide. Although no particular limitation is placed on the temperature at which the polymerization reaction is carried out, it preferably ranges from –150° C. to 160° C. and more preferably from –30° C. to 80° C. The reaction time is the time required for the consumption of ethylene oxide, and it usually ranges from 5 seconds to 100 hours and preferably from 1 to 60 hours. The polymerization reaction is preferably carried out in an inert atmosphere of argon, nitrogen gas or the like.

Thus, there is obtained a product in which the molecular end opposite to the end having amino-protecting groups is in the form of an alkali metal alcoholate. Although the process for producing this product is within the scope of the present invention, the product may be directly used without separating it from the reaction mixture, if desired. That is, the product may further be polymerized by adding a cyclic diester of the following formula (III) to the reaction mixture.

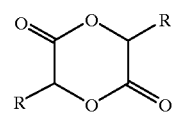

wherein R has the same meaning as described above. Thus, the segment

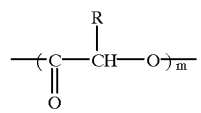

included in formula (I) is formed. R in this segment depends on the type of the cyclic ester of formula (III). Where the two R radicals in formula (III) are different from each other, the R radicals in two adjacent ones of the repeating units constituting the segment may be different from each other. However, each R is preferably an identical radical selected from a hydrogen atom and a $C_{1-6}$ alkyl group. The $C_{1-6}$ alkyl group is an optionally branched alkyl group and may be, for example, methyl, ethyl, n-propyl, isopropyl, n-butyl, sec-butyl or n-hexyl. Among others, methyl is preferred.

The reaction for the formation of this segment may be carried out under substantially the same conditions as described above in connection with the polymerization reaction of ethylene oxide. Also in the block copolymer thus obtained, the molecular end (ω-end) opposite to the molecular end (α-end) having an aminoprotecting group is in the form of an alkali metal alcoholate.

Both the aforesaid alcoholate derived from ethylene oxide and the alcoholate derived from a cyclic diester may further be subjected to anionic polymerization using a suitable monomer. Alternatively, they may be subjected to a substitution reaction with a suitable compound serving as a reaction stopper. For example, a polyoxyethylene derivative of formula (I) in which Y is a hydrogen atom can be obtained by using water as a stopper. Alternatively, by using another stopper, namely a compound having an organic group which, when Y in formula (I) is an alkali metal, can be introduced by replacing the alkali metal therewith (this organic group will hereinafter referred to as the Z group or a group of the formula

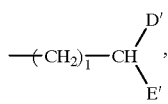

and the details of these groups will be described later), polyethylene derivatives in which Y is the Z group or

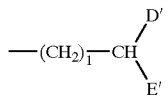

can be produced. Although these reaction steps may be carried out as required, the process for producing a polyethylene derivative which includes these reaction steps as essential steps is also within the scope of the present invention.

The aforesaid compound having the Z group or

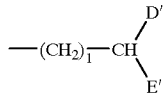

may be selected, for example, from the group consisting of:
(i) a halogenide of the formula (IV)

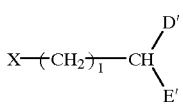
(IV)

wherein D' and E' each independently represent an alkoxy group or represent groups capable of combining with the carbon atom adjacent thereto to form 1,3-dioxolane that may be substituted by a $C_{1-6}$ alkyl group at the 4- or 5-position, X represents a chloride, bromine or iodine atom, and l is an integer of 0 to 10; and
(ii) a halogenide of the formula (V)

X—Z    (V)

wherein X is a chlorine, bromine or iodine atom, and Z is acryloyl, methacryloyl, cinnamoyl, mesyl, tosyl, allyl, carboxymethyl, ethoxycarbonylmethyl, ethoxycarbonylethyl, vinylbenzyl, N-phthalimidoethyl, N-phthalimidopropyl or N-phthalimidobutyl.

The alkoxy groups represented by D' and E' in the above formula (IV) are preferably $C_{1-6}$ alkoxy groups, and specific examples thereof include methoxy, ethoxy, n-propoxy, isopropoxy, n-butoxy, n-pentoxy and n-hexoxy. The 1,3-dioxolane group which can be formed by the combination of D' and E' with the carbon atom adjacent thereto is represented by the formula

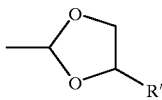

wherein R' is a hydrogen atom or a $C_{1-6}$ alkyl group. Specific examples of the $C_{1-6}$ alkyl group represented by R' include methyl, ethyl, n-propyl, isopropyl, n-butyl, sec-butyl, n-pentyl and n-hexyl.

The reaction of the polyoxyethylene derivative of formula (I) in which Y is an alkali metal with the compound of formula (IV) or (V) may also be carried out under substantially the same reaction conditions as described above in connection with the polymerization of ethylene oxide in the presence of a compound of formula (II), except that an organic base (e.g., triethylamine), if necessary, and the compound of formula (IV) or (V) are added to the reaction mixture in which the polyoxyethylene derivative has been formed. Specifically, this reaction may be carried out, for example, according to the process described in WO96/32434. The contents of this international publication pamphlet is incorporated herein by reference.

The compound of formula (IV) or (V) is usually used in an amount of 1 to 20 moles per mole of the polyoxyethylene derivative of formula (I) in which Y is an alkali metal.

The resulting polyoxyethylene derivative of formula (I) in which Y is a group of the formula

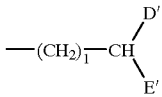

or the Z group may be isolated as required and then subjected to an additional reaction.

Specifically, the polyoxyethylene derivative of formula (I) in which Y is a group of the formula

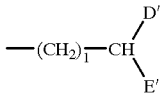

is a derivative having an organosilyl-protected amino group at the α-end and a protected aldehyde group at the ω-end. After this derivative is separated from the reaction mixture, for example, by precipitation with a solvent, only the amino-protecting groups (A' and B') may be selectively eliminated by subjecting the derivative to an elimination reaction in a solution of a tetraalkylammonium fluoride (in which each alkyl group is a $C_{1-6}$ alkyl group as described above and preferably a butyl group) in the same solvent as used for the aforesaid polymerization reaction, at room temperature for a period of time ranging from 30 minutes to 5 hours. Throughout the above-described reactions, a derivative of formula (I-a) having a free amino group at one end (i.e., the α-end) and a protected aldehyde group (an acetal group) at the other end (i.e., the ω-end) can be obtained in an about 80% yield based on the compound of formula (II).

On the other hand, the acetal group at the ω-end can be converted to a free aldehyde group by hydrolysis under stronger acid conditions (at a pH of about 2) as is known per se.

Moreover, the polyoxyethylene derivative of formula (I) in which Y is the Z group may further be subjected to various reactions in the state retaining A' and B', so that the Z group can be converted to other groups. The present inventors are particularly interested in the following example of the conversion reaction of the Z group, though the present invention is not limited thereto.

For example, where the Z group is oxymesyl (—O—SO$_2$CH$_3$), the polyoxyethylene derivative of formula (I) may be subjected to a per se known reaction in which it is reacted with potassium O-ethyl-dithiocarboxylate, for example, in an organic solvent, and then reacted with an organic amine. Thus, the hydroxyl group at the ω-end can be converted to a mercapto group. After this conversion reaction, A' and B' may be eliminated, if necessary, according to the above-described method.

Owing to the characteristics of the aforesaid reaction (i.e., anionic living polymerization), the number (n) of oxyethylene repeating units, —(CH$_2$CH$_2$O—)$_n$, and the number (m) of ester repeating units,

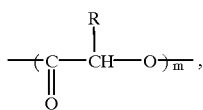

if present, can theoretically be adjusted to a value of 1 to about 10,000, by appropriately choosing the proportions of the corresponding monomers [i.e., ethylene oxide and the cyclic diester of formula (III)] to the initiator. Although the numbers of these repeating units cannot be clearly defined because their preferred ranges may vary according to the purpose for which the resulting polyoxyethylene derivative is used, n is generally an integer in the range of 1 to 20,000 and m is generally an integer in the range of 0 to 20,000.

Among the polyoxyethylene derivatives thus obtained, the derivatives represented by the above formula (I-a) are, to the present inventors' knowledge, novel compounds which have not been described in the literature of the prior art. That is, the polyoxyethylene derivatives of formula (I-a) in which A and B are organosilyl groups are all novel. When both A and B in formula (I-a) are hydrogen atoms, the polyoxyethylene derivatives of formula (I-a) in which Y is a group of the above formula

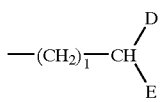

[wherein D and E may not only represent the groups defined for D' and E', but may also be united together to form an oxy radical (=O)] are also novel.

In the polyoxyethylene derivatives of formula (I-a) in which Y is an organic group other than a group of the formula

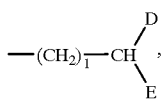

it is intended that, in addition to the aforesaid Z group, Y may also represent various groups which can be derived from the Z group according to per se known reactions. Specific examples thereof include ester-forming groups such as acryloyl (—COCH=CH$_2$), methacryloyl (—COC(CH$_3$)=CH$_2$), cinnamoyl

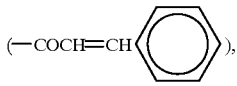

mesyl (—SO$_2$CH$_3$) and tosyl

Moreover, they also include ether-forming groups such as allyl (—CH$_2$CH=CH$_2$), carboxymethyl (—CH$_2$COOH), carboxyethyl (—CH$_2$CH$_2$COOH), ethoxycarbonylmethyl (—CH$_2$COOC$_2$H$_5$), ethoxy-carbonylethyl (—CH$_2$CH$_2$COOC$_2$H$_5$), 2-aminoethyl (—CH$_2$CH$_2$NH$_2$), 3-aminopropyl (—CH$_2$CH$_2$CH$_2$NH$_2$) and vinylbenzyl

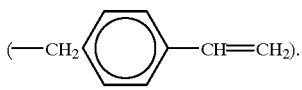

The aforesaid polyoxyethylene derivatives provided by the present invention are usually used in the form in which both ends are separately protected or at least one end is protected, so that the function of the functional group at any one end can be utilized. Moreover, in the derivatives in which both ends are protected, the functions of the polyoxyethylene segment and the ester segment, if present, can also be utilized. Furthermore, the aforesaid derivatives in which, for example, one of the amino and aldehyde groups is in the free state can be utilized to modify or improve proteins and other organic compounds having a carboxyl or amino group, by taking advantage of the functionality of those groups.

The present invention is more specifically explained with reference to the following examples. However, these examples are not to be construed to limit the scope of the invention.

EXAMPLE 1

Preparation of a Polyoxyethylene Derivative having a Silyl-protected Amino Group at One End and an Acetal Group at the Other End

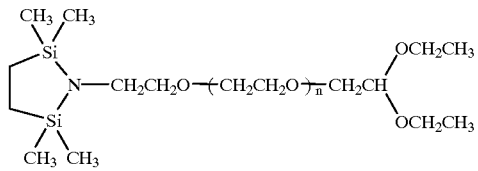

In an eggplant type flask having an atmosphere of argon, a potassium amide of an initiator was formed by adding 1 mmol of 2,2,5,5-tetramethyl-2,5-disila-1-azacyclopentane (which may hereinafter be referred to as TDA) and 1 mmol of potassium naphthalene to 30 mL of tetrahydrofuran. After 100 mmol of ethylene oxide was added to this solution, the resulting mixture was reacted at room temperature for 2 days. After completion of the reaction, 10 mmol of 2-bromo- 1,1-diethoxyethane was added and the reaction was continued for an additional 2 days. After completion of the reaction, the resulting polymer was recovered by precipitation with ether. Its yield was 95%. The molecular weight of the polymer thus obtained was 4,200 as measured by gel permeation chromatography. Moreover, by analyzing its $^1$H-NMR spectrum, it was confirmed that a silylamino group and an acetal group had been almost quantitatively introduced at the α-end and the ω-end, respectively (see FIG. 1).

EXAMPLE 2

Selective Deprotection of the Silylamino Group

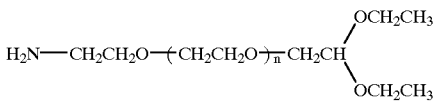

Figure 2:
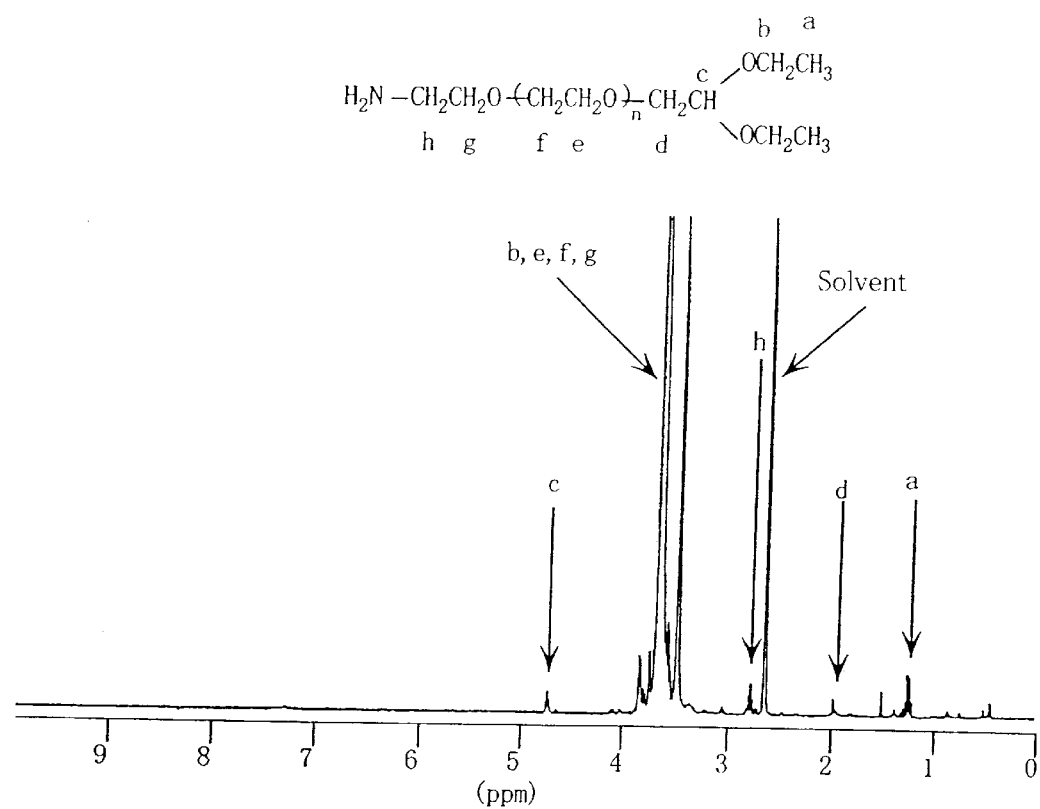
FIG. 2 shows the $^1$H-NMR spectrum of the heterotelechelic polyoxyethylene derivative obtained in Example 2 and having a free amino group at the α-end and an acetal group at the ω-end.

1 g of the polyoxyethylene derivative obtained in Example 1 was dissolved in 20 mL of THF, and 5 mL of a THF solution (1 mol/L) of tetrabutylammonium fluoride was added thereto. This mixture was stirred for 1 hour. After completion of the reaction, the resulting polymer was recovered by precipitation with isopropyl alcohol. Its yield was 90%. By analyzing its $^1$H-NMR spectrum, it was confirmed that the silyl groups at the α-end had completely disappeared as a result of deprotection, and the resulting polymer was polyoxyethylene having an amino group at the α-end and an acetal group at the ω-end (see FIG. 2).

EXAMPLE 3

Preparation of a Polyoxyethylene Derivative Having a Silyl-protected Amino Group at One End and a Methacryloyl Group at the Other End

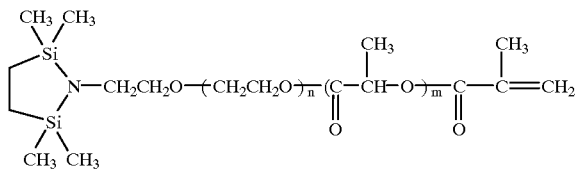

Figure 3:
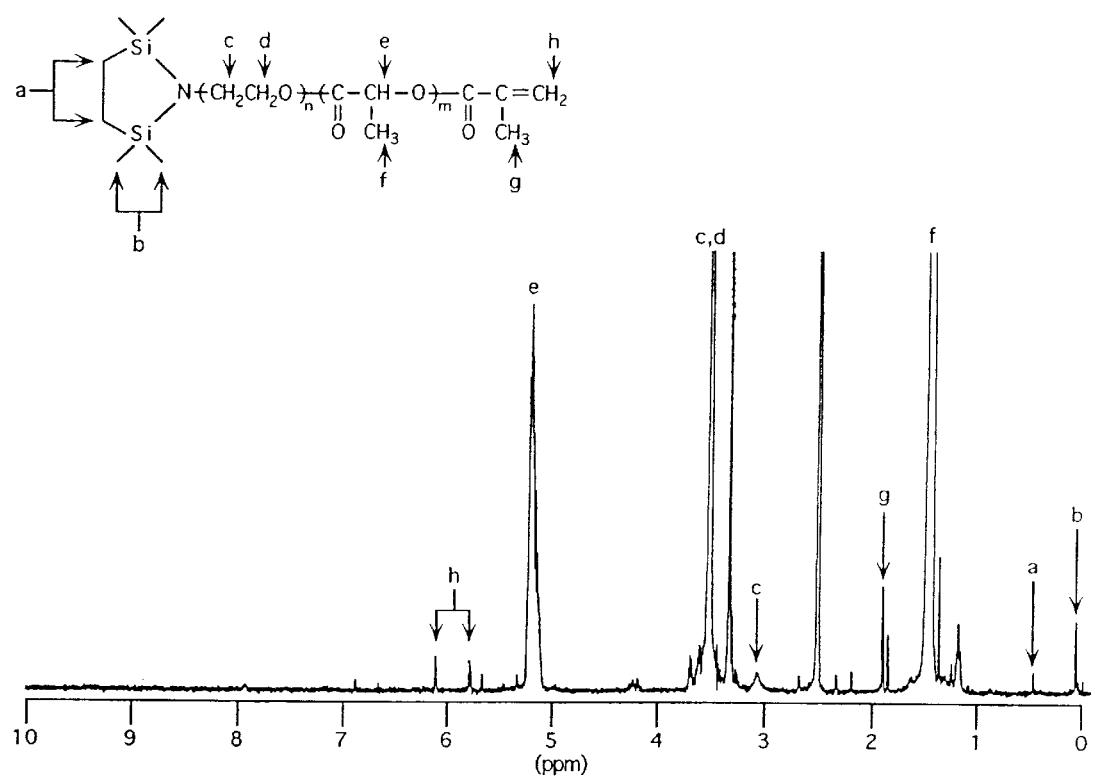
FIG. 3 shows the $^1$H-NMR spectrum of the heterotelechelic block copolymer obtained in Example 3 and having an organosilyl-protected amino group at the α-end and a methacryloyl group at the ω-end.

In an eggplant type flask having an atmosphere of argon, a potassium amide of an initiator was formed by adding 1 mmol of 2,2,5,5-tetramethyl-2,5-disila-1-azacyclopentane and 1 mmol of potassium naphthalene to 50 mL of THF. After 100 mmol of ethylene oxide was added to this solution, the resulting mixture was reacted at room temperature for 2 days. After completion of the reaction, the reaction mixture was mixed with a THF solution containing 50 mmol of DL-lactide, and reacted at room temperature for 3 hours. Then, 15 mmol of triethylamine and 15 mmol of methacryloyl chloride were added thereto, followed by stirring at room temperature for 30 minutes. After the resulting polymer was precipitated by the addition of 300 ml of isopropanol, the reaction mixture was centrifuged at 5,000 rpm at −10° C. for 40 minutes. A benzene solution of the precipitate so collected was freeze-dried to obtain 11 g of the desired polyoxyethylene derivative (in a 95% yield). By analyzing its $^1$H-NMR spectrum, it was confirmed that a methacryloyl group had been almost quantitatively introduced at the ω-end (see FIG. 3).

What is claimed is:

1. A Process for producing a polyoxyethylene derivative of the formula (I)

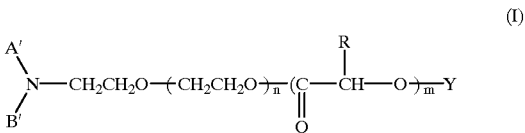

wherein

A' and B' each independently represent an organosilyl type amino-protecting group, or represent organosilyl type amino-protecting groups capable of combining with the nitrogen atom adjacent thereto to form a four- to seven-membered disila-azacyclo heterocyclic ring, Y represents a hydrogen atom, an alkali metal, or an organic group which, when Y is an alkali metal, can be introduced by replacing the alkali metal therewith according to a suitable reaction, R represents a hydrogen atom or a $C_{1-6}$ alkyl group, n is an integer of 1 to 20,000, and m is an integer of other than 0 up to 20,000, the process comprising the steps of polymerizing ethylene oxide in a suitable organic solvent in the presence of a living polymerization initiator of the formula (II)

wherein A' and B' have the same meanings as defined for formula (I), and M represents an alkali metal; if necessary, further polymerizing the resulting product with a cyclic diester of the formula (III)

wherein each R independently represents a hydrogen atom or a $C_{1-6}$ alkyl group; and, if necessary, reacting the resulting product with a compound having an organic group which, when Y is an alkali metal, can be introduced by replacing the alkali metal therewith.

2. A process for producing a polyoxyethylene derivative as claimed in claim 1 wherein A' and B' are organosilyl type amino-protecting groups capable of combining with the nitrogen atom adjacent thereto to form a four- to seven-membered disila-azacyclo heterocyclic ring.

3. A process for producing a polyoxyethylene derivative as claimed in claim 1 wherein A' and B' are organosilyl type amino-protecting groups capable of combining with the nitrogen atom adjacent thereto to form 2,2,5,5-tetramethyl-2,5-disila-1-azacyclo-pentane.

4. A process for producing a polyoxyethylene derivative as claimed in claim 1 wherein the compound having an organic group which, when Y is an alkali metal, can be introduced by replacing the alkali metal therewith according to a suitable reaction is represented by the formula

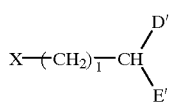
(IV)

in which D' and E' each independently represent an alkoxy group, or represent groups capable of combining with the carbon atom adjacent thereto to form 1,3-dioxolane that may be substituted by a lower alkyl group at the 4- or 5-position, X represents a chlorine, bromine or iodine atom, and l is an integer of 0 to 10.

5. A process for producing a polyoxyethylene derivative as claimed in claim 1 wherein the compound having an organic group which, when Y is an alkali metal, can be introduced by replacing the alkali metal therewith according to a suitable reaction is represented by the formula (V)

(V)

in which Z is acryloyl, methacryloyl, cinnamoyl, mesyl, tosyl, allyl, carboxymethyl, ethoxycarbonylmethyl, ethoxycarbonylethyl, vinylbenzyl, N-phthalimidoethyl, N-phthalimidopropyl or N-phthalimidobutyl, and X has the same meaning as defined above for formula (IV).

6. A polyoxyethylene derivative of the formula (I-a)

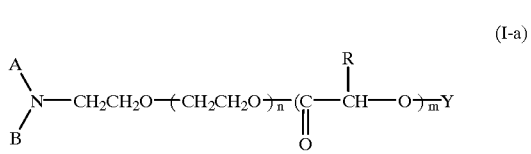
(I-a)

wherein:
  A and B each independently represent a hydrogen atom or an organosilyl type amino-protecting group, or represent organosilyl type amino-protecting groups capable of combining with the nitrogen atom adjacent thereto to form a four- to seven-membered disila-azacyclo heterocyclic ring,
  Y represents a hydrogen atom, an alkali metal, or an organic group which, when Y is an alkali metal, can be introduced according to a suitable reaction,
  R represents a hydrogen atom or a $C_{1-6}$ alkyl group,
  n is an integer of 1 to 20,000, and
  m is an integer of other than 0 up to 20,000, provided that, when both A and B are hydrogen atoms, Y is a group of the formula

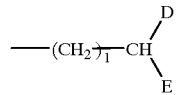

wherein D and E each independently represent an alkoxy group or represent groups capable of combining with the carbon atom adjacent thereto to form 1,3-dioxolane that may be substituted by a lower alkyl group at the 4- or 5-position, or D and E are united together to form an oxo radical (=O), and l is an integer of 0 to 10.

7. A polyoxyethylene derivative as claimed in claim 6 wherein R is a hydrogen atom or a methyl group.

8. A polyoxyethylene derivative as claimed in claim 6 wherein A and B are organosilyl type amino-protecting groups capable of combining with the nitrogen atom adjacent thereto to form a four- to seven-membered disila-azacyclo heterocyclic ring.

9. A polyoxyethylene derivative as claimed in claim 6 wherein the disila-azacyclo heterocyclic ring is 2,2,5,5-tetramethyl-2,5-disila-1-azacyclopentane.

10. A polyoxyethylene derivative as claimed in claim 6 wherein D and E are each independently an alkoxy group, or are groups capable of combining with the carbon atom adjacent thereto to form 1,3-dioxolane that may be substituted by a lower alkyl group at the 4- or 5-position.

11. A polyoxyethylene derivative as claimed in claim 6 wherein Y is selected from the group consisting of a hydrogen atom, alkali metals, acryloyl, methacryloyl, cinnamoyl, mesyl, tosyl, allyl, carboxyethyl, ethoxycarbonylmethyl, ethoxycarbonylethyl and vinylbenzyl groups, or the group —OY comprising Y combined with the oxygen atom adjacent thereto is a mercapto group.

12. A polyoxyethylene derivative of the Formula (I-a)

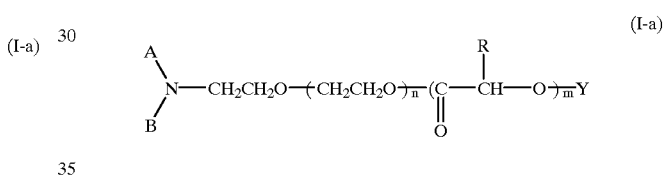
(I-a)

wherein:
  A and B each independently represent an organosilyl type amino-protecting group, or represent organosilyl type amino-protecting groups capable of combining with the nitrogen atom adjacent thereto to form a four- to seven-membered disila-azacyclo heterocyclic ring,
  R represents a hydrogen atom or a $C_{1-6}$ alkyl group,
  n is an integer of 1 to 20,000,
  m is an integer of 0 to 20,000, and
  Y is a group of the formula

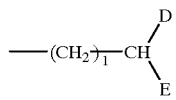

wherein D and E each independently represent an alkoxy group, or represent groups capable of combining with the carbon atom adjacent thereto to form 1,3-dioxolane that may be substituted by a lower alkyl group at the 4- or 5-position, or D and E are united together to form an oxo radical (=O), and l is an integer of 0 to 10.

* * * * *